Patented Apr. 9, 1940

2,196,875

UNITED STATES PATENT OFFICE 2,196,875

BRONZE BEARING AND METHOD OF MANUFACTURE

Louis Sandler and Louis G. Klinker, New Castle, Pa., assignors to Johnson Bronze Company, New Castle, Pa., a corporation of Pennsylvania No Drawing. Application May 22, 1939,
Serial No. 275,004

11 Claims. (Cl. 75—22)

This application is a continuation-in-part of our co-pending application Serial No. 219,828, filed July 18, 1938.

This invention relates to bronze bearings and method of manufacture, and more especially to bearings made by the molded powder process.

Bronze bearings are made by the casting process and by the powder process. In the casting process the bronze may be either cast into the shape of the completed bearing, the interior of which is machined to final dimensions, or the bronze may be cast in the form of a sheet which is bent into a bearing sleeve. The cast bronze metal has certain distinct advantages for bearing purposes. Lead may be incorporated into the molten metal. When the bronze is cast, the lead, up to about 10%, is held in a state of microscopic subdivision among the bronze particles. The lead does not form a true alloy with the bronze but, on freezing, separates into individual lead particles distributed through a bronze matrix. In the common bearing bronze of 80 parts copper, 10 parts tin, and 10 parts lead, the lead is retained in a finely divided uniform dispersion in the bronze casting. In retaining lead distributed in the casting, bronze acts differently from copper, which because of an apparently closer grained structure, will not retain the lead particles in suspension like bronze.

Another advantage of cast bronze for bearings lies in the micro-structure produced when the metal freezes from the molten state. When the tin is about 7% or more, the bronze consists of the so-called alpha solid solution of tin in copper, microscopically intermingled with which is so-called alpha-delta eutectoid, the delta constituent of which is much harder than the alpha solid solution, so that this eutectoid gives the desired hardness to the bearing metal.

Also, since the crystalline structure of the bronze is determined by its freezing from a molten solution of copper and tin, the crystalline structure attains its final size and the crystalline growth does not occur as in the so-called bronzes made by the powder process.

Bronze bearings are also made by the powder process, in which powdered copper and powdered tin are mixed, cold molded under high pressure into bearing shape, and then sintered in a reducing atmosphere to form a composition resulting from the sintering of the copper and tin. These bearings have certain advantages. Constituents may be incorporated in the bearings which could not be incorporated into molten metal. Also, the bearings may be made with a certain porosity. These characteristics have been taken advantage of in the manufacture of the so-called oilless bearings, in which graphite and a volatile constituent, such as naphthalene, are mixed with the powdered tin and copper before molding. Upon heating, the naphthalene is driven off, leaving a porous structure containing graphite and which may be impregated with oil to form a so-called oilless bearing.

The bronze bearings made by the powder process, however, have several distinct disadvantages compared with bearings made from cast bronze. While there have been many suggestions of incorporating lead into the sintered powder bearings, so far as we are aware, it has been impracticable to do this in the commercial manufacture of bearings. Lead is a highly desirable unctuous bearing material and is used almost universally in bearing alloys, such as bronze, Babbitt metal, etc. However, when it is attempted to incorporate powdered lead in bearings made by sintering powdered copper and tin, the lead sweats out and runs down the sides of the bearings during the sintering operation. To overcome this, various suggestions have been made for methods of retaining the lead in a sintered powder bearing but, so far as we are aware, none of them has proved to be practicable.

Another disadvantage of making bronze bearings by sintering powder copper and tin is the resultant type of alloyage. During sintering, tin goes into solid solution in the copper but only incompletely. The resultant structure is in part a solid solution of tin and copper, and in part unalloyed metallic copper and unalloyed metallic tin. It lacks the characteristic crystalline structure of the cast bronzes, in which the alpha solid solution of tin and copper is reinforced and hardened by the alpha-delta eutectoid. The metal of the sintered product lacks the desired hardness of the cast product.

Furthermore, since the alloyage of copper and tin cannot take place as completely as when the two metals are molten together, there is a tendency for continued grain growth to take place, which increases the volume of the metal and may make the bearing, particularly when enclosed in an iron shell, seize on the shaft.

We have found that we can combine the advantages of the cast bronze bearing in a sintered powder bearing by using as the basis of the powder to be sintered, finely comminuted previously cast bronze. These bronze particles have the micro-structure of a cast bronze, as contrasted with the micro-structure of a sintered composition of copper and tin. By using a lead-bearing cast bronze, the lead is microscopically and uniformly distributed in the bronze matrix. The bronze particles also have the desirable physical characteristics of cast bronze resulting from the mixture of alpha solid solution and the eutectoid. Since the crystalline structure of the bronze is that obtained by casting, grain growth is avoided. Solid substances, such as graphite, may be incorporated so that the bearing will have the double lubricating properties of the finely dispersed lead plus the graphite. Also, material such as naphthalene, may be incorporated to produce an oil absorptive porous structure, if desired.

We have found that to produce a bearing of the proper structure, strength, homogeneity, and density, that the bronze particles must be produced by fine grinding of the cast bronze. For good results, it should be comminuted to a fineness where substantially all of the material will pass through an 80 mesh to the inch screen, or even finer. The grinding results in the production of rounded bronze particles.

The particles of pure metals which are used in the sintered powder process, such as metallic copper and tin, are usually made by an electrolytic process or by the reduction of reducible metallic compounds, which result in the formation of metallic particles of irregular shape. Electrolytic powders have a very irregular dendritic form. The powders formed by reduction of metallic compounds, while not dendritic like the electrolytic powders, are generally porous and have microscopically pitted surfaces. When such irregularly shaped particles are cold pressed, they tend to knit together and give the cold pressed bearing a green strength which permits the bearings to be handled between their molding and the sintering operation.

The rounded bronze particles which are necessarily produced by grinding, do not knit like irregularly shaped particles when cold pressed and, for that reason, we impart better cold pressing properties to the mass of bronze particles so that they will knit together under pressure. This may be done by a preliminary treatment in which the bronze particles have attached to them small metal particles to thereby roughen their surfaces, or irregularly shaped particles of pure metal, such as electrolytically produced copper and/or tin powder, may be mixed with the rounded bronze particles to impart proper green strength to the molding mixture. The roughening of the surfaces of the bronze particles or the addition of the other metal powders also increases the strength of the bearings in the sintered state. When the mass is finally sintered the added metal powders tend to form a matrix encapsuling the bronze particles and tending to seal in the lead.

Having described generally the nature and objects of our invention, we will now proceed with a detailed description of its preferred embodiments.

In the preferred process, the rounded bronze particles have their surfaces roughened by a preliminary treatment, which we may designate as "copperizing." The pre-cast bronze is first reduced to powdered form by grinding. The bronze is preferably the waste borings or turnings from the manufacture of cast bronze bearings and usually contains lead. A typical formula for such bearing bronze is 80 parts copper, 10 parts tin, and 10 parts lead. The bronze is preferably ground to a particle fineness such that 50% passes a 325 mesh to the inch screen and all the particles pass a 100 or a 150 mesh to the inch screen. The grinding produces particles which are of a rounded or nodular shape. In the usual grinding operation the particles become coated with oxide.

The bronze powder so prepared is mixed with a copperizing material, preferably powdered copper of a fineness such that 80% passes a 325 mesh screen and all passes a 150 mesh screen. Preferably, the copper particles average considerably finer than the bronze particles. The proportions of bronze and copper may vary quite widely depending upon the amount of lead in the cast bronze and the amount of lead desired in the finished bearing. In general practice the more common lead-bearing cast bronzes contain about 10% lead, and when these bronzes are used as a base for the copperized bronze powder, the bronze is preferably about 30 to 70% of the total and the copper preferably about 50 to 20% of the total. A typical mix consists of 50 parts of bronze powder and 50 parts of copper powder. Ammonium chloride in amounts from ½ to 1½% may be added as a flux.

The powder mixture is then heated in a reducing atmosphere to a temperature of from 500 to 1800° F., preferably in the neighborhood of 1300° F., until the mass becomes sintered together, forming lumps or masses of the copperized bronze particles. As indicated, the sintering temperature may vary quite widely. It should be below the fusing point of copper but should be high enough to cause a fairly prompt sintering of the copper particles on to the surface of the bronze particles. The sintered mass is then reground to form a powder consisting of the copperized bronze particles, which are used as a basis for making the molded bearings, as hereinafter described. The copperizing treatment causes small particles of copper to adhere to and become sintered to the surface of the bronze particles so as to form tentacles. The bronze particles, after the copperizing treatment, appear under the microscope to have the rough dendritic characteristics of molding powders produced by electrolysis. These roughened bronze particles knit together much more firmly than smooth particles and give a greater strength to the bearings both in their green and sintered state.

It is preferred to use a bronze powder which is ground under oxidizing conditions and in which the particles have an oxide coating. This oxide coating is reduced by the reducing atmosphere in the sintering treatment and the metal so reduced at the surface of the bronze particles apparently has a greater affinity for the copper particles and causes them more tightly to adhere to the surface of the bronze particles. However, if desired, the bronze may be ground in a neutral or reducing atmosphere and oxide-free bronze particles produced, which do not require the reduction of oxide films in the sintering operation.

While powdered copper is the preferred copperizing material, other cupreous materials may be used, such as compounds of copper which are readily reducible to metallic copper during the sintering. For example, the bronze powder may be mixed with powdered copper oxide, copper cyanide, copper oxalate, copper formate, etc., in which case the reducing atmosphere and heat reduces the copper compounds to particles of metallic copper which adhere to, copperize and roughen the surfaces of the bronze particles.

The sintered mass is subjected to a regrinding operation to reduce it to a power, the particles of which are slightly larger than the original bronze particles due to their increase in size by the copper coating.

To make the molding mixture for bearings, a small amount of powdered tin is preferably mixed with the copperized bronze particles. Preferably the amount of tin added is such that the final mix contains about 10% total of tin including both the tin powder added at this step and the tin content of the powdered bronze. The total tin content may, however, vary from zero to about 20%, preferably from about 2.5% to 20%. The tin is preferably a very finely ground powder so as to all pass a 325 mesh to the inch screen with about 40% minus 15 microns.

We may also incorporate graphite in the mix as an additional lubricant, using from 1 to 10 parts graphite, usually about 1 to 2 parts of graphite, to 100 parts of the powdered metal. If a porous bearing is desired, a volatile material which can be driven off during sintering, such as naphthalene, may be mixed with the molding powder, preferably from 1 to 5 parts naphthalene to 100 parts of the powdered metal. Instead of naphthalene, we may use other volatile materials, such as phthalic anhydride, hexamethylenetetramine or ammonium carbonate. Either or both of these components may be omitted if a non-porous bearing is desired, or one without a graphite lubricant distributed therethrough.

The mixture is molded, preferably cold, into the bearings in suitable pressure molding apparatus, preferably stop molds having a compression ratio of about 2¼ to 1. A higher compression ratio may, however, be used if a denser bearing is desired. In making a porous bearing the porosity may be varied by varying the compression.

Because of the tentacle studded-like or roughened surfaces of the copperized bronze particles, the green bearings as they come from the mold have ample strength to permit the necessary handling before the final sintering. This added strength is of considerable importance in manufacturing operations because the green bearings have to be taken from the molds and handled and put into the sintering furnaces.

While it is preferred to mix a small amount of tin with the copperized particles before molding, the tin may be omitted, since the copperized bronze particles can be sintered together without tin, although with somewhat less strength in the bearing. The original bronze usually contains some tin so that the final bearing will generally have a tin content even if tin powder is not added.

Other metalliferous powders, such as powdered aluminum, zinc, or tin, or reducible compounds thereof, or even finely ground bronze, may be substituted in whole or in part for the copper. Also other metallic powders, such as powdered aluminum or zinc, may be substituted in whole or in part for the tin. While it is preferred that the particles of the added metal powders be of irregular shape, such as produced by electrolysis the particles of the added powder may be smooth, since the knitting effect is produced principally by the particles of the added metal adhering to the bronze particles so as to stud and roughen their surfaces.

The molded bearings are sintered by heating them to a temperature of from about 1300° F. to about 1600° F., preferably in the neighborhood of 1500° F. The temperature at which the sintering is conducted is sufficient to fuse the tin but not the bronze. The copperized bronze and tin particles become sintered together to form a substantially homogeneous mass consisting of bronze particles united by a matrix formed by the sintering together of the tin particles and the copper coatings of the bronze particles. Such matrix tends to encapsule the bronze particles and seal the lead within them. However, since the lead is very largely distributed in microscopic particles throughout the mass of the bronze particles, there is little, if any, tendency for the lead to separate from the bronze. The sweating of lead which is encountered when an attempt is made to incorporate lead powders in a molding mix is overcome in bearings made by our method.

If a volatile component, such as naphthalene, has been added to the mix, its vaporization during the sintering leaves voids in the finished bearing which serve to hold oil if a porous, oilless bearing is desired.

The finished bearing is characterized by a high finished strength and excellent bearing qualities. The latter are improved by the use of a powdered bronze which contains lead. The treatment by which a binder metal is used which roughens the surfaces of the bronze particles, contributes to the finished strength as well as to the green strength of the bearings. The relatively low cost of bronze borings or turnings which are used as the source of the bronze material makes possible a cheaper bearing than one made from powdered copper and tin. The bronze particles are homogeneously distributed throughout the mass of the bearing, which has a high degree of uniformity in its composition. The bronze has the crystalline structure of cast bronzes and the bearing is harder than one made of sintered powder and tin. Furthermore, there is little or no tendency toward grain growth, which is often encountered in bearings made by the sintering process from powdered copper and tin. This grain growth causes a slight swelling of the bearing and since the bearing is often made in the form of an encased bushing, it creates a tendency for the bearing to seize on its shaft. This difficulty is not experienced in our bearings because the bronze crystals have already assumed their permanent size.

While we prefer to subject the bronze particles to a preliminary sintering treatment with an added binder metal to roughen their surfaces, the bronze particles may be employed without such surface roughening treatment, in which case they are mixed with a powdered metal which will serve as a binder metal in making the molding mixture. Such powdered metal should have irregularly shaped particles, such as are characteristic of electrolytically produced metal powders. In accordance with this modified procedure, we first form bronze powder by grinding, as described above, preferably to a fineness such that 50% passes a 325 mesh to the inch screen and all passes a 100 or 150 mesh to the inch screen. If a substantial oxidation of the particles occurs during grinding, we prefer to subject the bronze particles to a preliminary deoxidizing treatment by heating them in a reducing atmosphere. The bronze particles, however, may be formed by grinding in an inert atmosphere, which obviates deoxidizing. The powdered bronze is then mixed with a binder metal having irregularly shaped particles, such for example as powdered copper, and having a particle size the same as the bronze powder but preferably somewhat smaller. Other metals, such as tin, aluminum or zinc, may be substituted in whole or in part for the copper. Preferably, both copper and tin powders are added to the bronze in proportions varying from about 25 to 90 parts powdered bronze, about 67.5 to 9 parts powdered copper, and about 17.5 to 1 part powdered tin. Graphite may be mixed with the powder as a lubricant and a volatile porosity-forming material, such as naphthalene and the like, may be incorporated into the mixture. A typical mixture comprises 50 parts of ground bronze particles, 45 parts of electrolytic powdered copper, 5 parts powdered tin, and 1½ parts powdered graphite, to which may be added from 1 to 5 parts naphthalene, the naphthalene being varied in amount to vary the porosity. The porosity may be also regulated by the molding pressure. Usually the porosity is regulated by both the amount of the volatile material and the molding pressure. The naphthalene may be omitted if a dense bearing is required. The graphite may be omitted if it is not wanted as a lubricant. The bearings are formed by pressing, preferably cold pressing, the mixture to shape. The molded bearings are placed in an oven where they are sintered in a reducing atmosphere at a temperature of about 1300 to 1600° F., preferably in the neighborhood of 1500° F. This causes the particles to become sintered together to form a substantially homogeneous mass, which may have voids left in it by the vaporization of the volatile material, if any, as well as having graphite particles distributed throughout the mass if graphite is used. When the mixture of copper and tin powders is added, a temperature is used which is sufficient to fuse the tin but not the copper and bronze. The fused tin apparently combines with the copper to form a bronze binder or matrix for the already existing bronze particles. This matrix apparently tends to encapsule and seal the lead in the bronze particles. However, as stated above, since the lead in the particles of cast bronze exists principally in the form of finely divided particles distributed throughout the bronze, there is little, if any, tendency of the lead to become segregated from its containing bronze particles, and sweating of lead is not encountered in the sintering process.

After sintering, the bearings, if porous, may be dipped in oil under vacuum.

We prefer to grind the bronze particles from a cast bearing bronze having a substantial lead content, for example, from a standard bearing bronze of 80 parts copper, 10 parts tin, and 10 parts lead. The proportions of the components of the bronze employed for grinding into the bronze particles may be varied quite widely and the bronze may be chosen with a view to producing the desired composition in the finished bearing. For example, if a bronze having a high lead content is used, a more unctuous bearing is provided. On the other hand, a bronze having a lower lead content provides a stronger bearing. If desired, various types of lead-bearing bronzes may be ground and blended to produce any desired lead content. While it is preferred to use a lead-bearing bronze, bronzes may be used which do not contain lead, or the so-called "brasses" may be used in which zinc instead of tin is alloyed with the copper. The term "bronze," therefore, when used broadly without further limitation herein, is intended to include the brasses which are used for bearing purposes.

Despite various impractical suggestions, the only known practical way, to our knowledge, of producing a lead-bearing bronze with the lead homogeneously distributed through it, is by casting from the molten state, and the only way to get lead-bearing bronze particles in which the lead is homogeneously distributed is by grinding up a previously cast lead-bearing bronze. The only way, to our knowledge, of producing a bronze powder of the requisite fineness for forming a strong, fine-grained, substantially homogeneous bearing material is by grinding. The grinding makes the particles round and smooth. Such particles do not lend themselves to cold pressing to give good green strength, or even good final strength. Accordingly, we incorporate a powdered binder metal with the smooth particles. Such binder metal may be sintered to the surface of the particles to roughen them, or a binder metal having irregularly shaped particles may be mixed with the bronze powder and the mixture molded. In either case, the molded article has both a good green and a finished strength. The bearings so produced combine the desirable characteristics of the sintered powder bearings, such as the incorporation of solid lubricants as graphite or having the porosity for impregnation with oil. The lead, which is uniformly distributed in the particles of the pre-cast bronze, does not sweat out when the molded bearings are sintered. The bronze has the uniform and characteristically desirable crystalline properties of a cast bronze as contrasted with the less desirable crystalline structure afforded by sintering copper and tin, which results in but an incomplete alloyage, and a bearing is produced which is more homogeneous and characterized by freedom from objectionable hard or soft spots. The tendency to grain growth is also substantially eliminated. Since the basis of the bearing is the bronze in which the copper and tin are already combined in the proper proportions, relatively small amounts of powdered material need be added as the binder metals, and this reduces the tendency of the metal constituents to segregate in the mix before and during the molding operation, which has been a recognized difficulty in making bearings of powdered pure metals.

While we have described the preferred embodiments and practice of our invention, it is to be understood that the invention may be otherwise embodied and practiced within the scope of the following claims.

We claim:

1. A sintered metal powder bearing consisting of approximately 25 to 90% of finely ground particles of a pre-cast lead-bearing bronze having the crystalline structure characteristic of a bronze solidified from a molten condition and having its lead content uniformly distributed as microscopic inclusions, and a binder metal of the class consisting of copper, tin, aluminum and zinc integrally bound with the bronze particles by a solid solution of the binder metal in the bronze.

2. The method of making sintered powdered lead-bearing bronze bearings comprising grinding a pre-cast lead-bearing bronze to form a finely divided bronze powder, mixing powdered copper and powdered tin with the bronze powder, molding bearings from the resulting mixture, and heating the molded bearings to a temperature sufficient to cause the powdered copper and tin to be sintered together and to the bronze.

3. The method of making bronze bearings comprising mixing powdered bronze and powdered copper, heating the mixture to a temperature sufficient to cause sintering of the particles, reducing the resulting mass to powdered form, adding a small amount of powdered tin thereto, molding the bearings from the resulting mixture, and heating the molded bearings to a temperature sufficient to cause sintering of the particles thereof.

4. The method of making bronze bearings comprising mixing powdered bronze and a cupreous material, heating the mixture to a temperature sufficient to cause a rough sintered coating of copper upon the bronze particles, reducing the resulting mass to powdered form, adding a small amount of powdered tin thereto, and forming bearings from the resulting mixture by a procedure which includes the step of heating the mixture to a temperature sufficient to cause a sintering together of the particles thereof.

5. A method of making bearings comprising forming a powder of lead-bearing bronze, mixing the bronze powder with a powdered cupreous material, heating the mixture in a reducing atmosphere to a temperature sufficient to cause a rough sintered coating of copper upon the bronze particles, reducing the resulting mass to powdered form, adding a small amount of powdered tin thereto, molding bearings from the resultant mixture, and heating the molded bearings to a temperature sufficient to cause the tin to become sintered with the copper coatings of the bronze particles and form a copper-tin binding matrix therefor.

6. A method of making bronze bearings comprising mixing finely divided bronze particles and a cupreous material, heating the mixture to a temperature sufficient to cause a rough sintered coating of copper upon the bronze particles, reducing the resulting mass to powdered form, and forming bearings from the powdered material by a procedure which includes the step of heating the powdered material to a temperature sufficient to cause a sintering together of the particles thereof.

7. A method of making bronze bearings comprising mixing finely divided bronze particles and a cupreous material, heating the mixture to a temperature sufficient to cause a rough sintered coating of copper upon the bronze particles, reducing the resulting mass to powered form, adding thereto a small amount of a powdered metal of the class consisting of tin, aluminum and zinc, and forming bearings from the resulting mixture by a procedure which includes the step of heating the mixture to a temperature sufficient to cause a sintering together of the particles thereof.

8. The method of making bronze bearings comprising mixing finely ground particles of pre-cast bronze and a metal of the class consisting of copper, tin, aluminum and zinc, heating the mixture to a temperature sufficient to cause the metal particles to form a rough sintered metallic coating on the bronze particles, reducing the resulting mass to powdered form, and forming bearings from the powdered material by a procedure which includes the step of heating the powdered material to a temperature sufficient to cause a sintering together of the particles thereof.

9. The method of making sintered powdered lead-bearing bronze bearings comprising grinding a pre-cast lead-bearing bronze to form a finely divided bronze powder, mixing with the bronze powder a powdered metal of the class consisting of copper, tin, aluminum and zinc, and forming bearings from the resulting mixture by a procedure which includes the step of heating the mixture to a temperature sufficient to cause a sintering together of the particles thereof.

10. The method of making sintered powdered lead-bearing bronze bearings comprising grinding a pre-cast lead-bearing bronze to form a finely divided bronze powder, mixing with the bronze powder a copper powder having irregularly shaped particles, and forming bearings from the resulting mixture by a procedure which includes the step of heating the mixture to a temperature sufficient to cause a sintering together of the particles thereof.

11. The method of making sintered powdered lead-bearing bronze bearings comprising grinding a pre-cast lead-bearing bronze to form a finely divided bronze powder, mixing powdered copper and powdered tin with the bronze powder, and forming bearings from the resulting mixture by a procedure which includes the step of heating the mixture to a temperature sufficient to cause a sintering together of the particles thereof.

LOUIS SANDLER.
LOUIS G. KLINKER.